United States Patent
Naoi et al.

(10) Patent No.: US 9,831,480 B2
(45) Date of Patent: Nov. 28, 2017

(54) FIBER-CONTAINING POLYMER FILM AND METHOD OF MANUFACTURING SAME, AND ELECTROCHEMICAL DEVICE AND METHOD OF MANUFACTURING SAME

(75) Inventors: Katsuo Naoi, Tokyo (JP); Kazutoshi Emoto, Tokyo (JP); Kiyonori Hinoki, Tokyo (JP); Masahiro Saegusa, Tokyo (JP); Kenji Nishizawa, Tokyo (JP); Mitsuo Kougo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 342 days.

(21) Appl. No.: 12/619,270

(22) Filed: Nov. 16, 2009

(65) Prior Publication Data

US 2010/0124705 A1 May 20, 2010

(30) Foreign Application Priority Data

Nov. 19, 2008 (JP) ................................. 2008-295604

(51) Int. Cl.
| | |
|---|---|
| H01M 10/0565 | (2010.01) |
| B32B 5/00 | (2006.01) |
| B05D 3/00 | (2006.01) |
| B05D 5/12 | (2006.01) |
| H01M 2/16 | (2006.01) |
| C08J 7/04 | (2006.01) |

(52) U.S. Cl.
CPC ............. *H01M 2/162* (2013.01); *C08J 7/047* (2013.01); *H01M 2/1653* (2013.01); *H01M 10/0565* (2013.01); *C08J 2309/02* (2013.01); *C08J 2327/00* (2013.01); *Y10T 428/24132* (2015.01)

(58) Field of Classification Search
CPC .. C08J 7/047; C08J 2309/02; H01M 10/0565; H01M 2/162; Y10T 428/24132
USPC ..................................... 428/114; 427/58, 331
See application file for complete search history.

(56) References Cited

U.S. PATENT DOCUMENTS

| | | | | |
|---|---|---|---|---|
| 3,578,544 A | * | 5/1971 | Thorsrud | ...................... 428/113 |
| 4,568,592 A | * | 2/1986 | Kawaguchi et al. | ......... 428/107 |
| 5,660,901 A | * | 8/1997 | Wong | .......................... 428/35.7 |
| 6,042,958 A | | 3/2000 | Denton et al. | |
| 7,311,989 B2 | | 12/2007 | Hommura | |
| 8,187,700 B2 | * | 5/2012 | Tsotsis | ......................... 428/221 |
| 2007/0264577 A1 | * | 11/2007 | Katayama | ............. H01M 2/162 |
| | | | | 429/246 |
| 2008/0177000 A1 | * | 7/2008 | Ahn et al. | ........................ 525/95 |
| 2011/0166243 A1 | * | 7/2011 | Kikuchi et al. | ............... 521/134 |
| 2011/0212321 A1 | * | 9/2011 | Cakmak et al. | .............. 428/323 |

FOREIGN PATENT DOCUMENTS

| | | |
|---|---|---|
| CN | 1155167 A | 7/1997 |
| CN | 1671776 A | 9/2005 |
| EP | WO2009/122961 | * 10/2009 |
| JP | A-3-46213 | 2/1991 |
| JP | A-10-312815 | 11/1998 |
| JP | A-11-219727 | 8/1999 |

(Continued)

*Primary Examiner* — Camie Thompson
(74) *Attorney, Agent, or Firm* — Oliff PLC

(57) ABSTRACT

A fiber-containing polymer film contains a host polymer and fibrous substances. The fiber-containing polymer film has an orientation area where the fibrous substances are oriented in a direction substantially parallel to a main surface of the fiber-containing polymer film and in substantially the same direction.

19 Claims, 9 Drawing Sheets

(56) References Cited

FOREIGN PATENT DOCUMENTS

| JP | A-11-260336 | 9/1999 |
| JP | A-2000-173655 | 6/2000 |
| JP | A-2002-129035 | 5/2002 |
| JP | A-2006-128095 | 5/2006 |
| JP | A-2007-042594 | 2/2007 |

* cited by examiner

FIBER-CONTAINING POLYMER FILM AND METHOD OF MANUFACTURING SAME, AND ELECTROCHEMICAL DEVICE AND METHOD OF MANUFACTURING SAME

BACKGROUND OF THE INVENTION

Field of the Invention

The present invention relates to a fiber-containing polymer film and a method of manufacturing the same, and an electrochemical device and a method of manufacturing the same.

Related Background Art

While an electrolytic solution infiltrated in a separator made of a polyolefin-based stretched porous film or the like has typically been used as an electrolyte for lithium-ion secondary batteries, studies of solid or gelled polymer solid electrolytes (SPE) using a polymer in an electrolytic material have been under way.

Known examples of polymer solid electrolytes for polymer lithium-ion secondary batteries include (i) a gel polymer type; (ii) a composite film made of ceramics and a polymer; (iii) one in which a gel polymer is formed on a nonwoven or stretched film; and (iv) one in which a mixture of a polymer and ceramics is formed on a nonwoven or stretched film. Among them, those of type (iii) in which a gel polymer is formed on a nonwoven or stretched film has been in use for many products.

Improvements in strength of polymer solid electrolytes at high temperatures have also been under study. Specifically, methods mixing ceramic particles and fibrous bodies into a polymer (see, for example, Japanese Patent Application Laid-Open Nos. 2000-173655, 2006-128095, and 03-046213), methods using nonwovens or porous bodies as aggregates (see, for example, Japanese Patent Application Laid-Open Nos. 11-260336 and 11-219727), and the like have been under study.

SUMMARY OF THE INVENTION

Introducing reinforcement structures into a polymer solid electrolyte as described in the above-mentioned Japanese Patent Application Laid-Open Nos. 2000-173655 and 2006-128095 improves the strength, but is problematic in that it increases impedance.

In view of the problem of the prior art mentioned above, it is an object of the present invention to provide a fiber-containing polymer film and a method of manufacturing the same which can yield a polymer solid electrolyte film having fully lowered impedance and such strength (heat resistance) as to be kept from short-circuiting (breaking) at high temperatures, and an electrochemical device and a method of manufacturing the same.

For achieving the above-mentioned object, the present invention provides a fiber-containing polymer film containing a host polymer and a fibrous substance, the fiber-containing polymer film having an orientation area where the fibrous substance is oriented in a direction substantially parallel to a main surface of the fiber-containing polymer film and in substantially the same direction.

The fiber-containing polymer film has an orientation area where the fibrous substance is oriented in a direction substantially parallel to the main surface of the fiber-containing polymer film and in substantially the same direction, and thus can yield a polymer solid electrolyte film which can fully lower the impedance while having a sufficient strength. That is, in this fiber-containing polymer film, the fibrous substance is oriented in substantially the same direction and thus secures its anisotropy more than when arranged randomly and the like, thereby forming ion-permeable interstices, which makes it possible to improve the strength and lower the impedance at the same time. Since the fibrous substance is oriented in a direction substantially parallel to the main surface of the fiber-containing polymer film, a fiber length seen in a surface direction can be taken longer than when the fibrous substance is oriented in a direction perpendicular to the main surface and the like, whereby the strength of the fiber-containing polymer film in the surface direction can be improved sufficiently. This can inhibit the polymer solid electrolyte film from migrating and causing a short circuit between positive and negative electrodes when a battery attains a high temperature.

Preferably, the orientation area exists over the whole area of the fiber-containing polymer film. This allows the fiber-containing polymer film of the present invention to improve the strength and lower the impedance at the same time with a higher level.

Preferably, in the fiber-containing polymer film of the present invention, the fibrous substance has an average fiber diameter of 100 to 500 nm and an average fiber length of 10 to 100 μm. This allows the fiber-containing polymer film of the present invention to improve the strength and lower the impedance at the same time with a higher level.

Preferably, the fiber-containing polymer film of the present invention contains 10 to 50% by volume of the fibrous substance based on the total volume of the fiber-containing polymer film. This allows the fiber-containing polymer film of the present invention to improve the strength and lower the impedance at the same time with a higher level.

Preferably, in the fiber-containing polymer film of the present invention, the fibrous substance is constituted by a polymer compound. This allows the fiber-containing polymer film to not only increase its strength but also have elasticity, whereby external stresses such as shocks and vibrations can more fully be prevented from causing cracks.

Preferably, the fibrous substance is constituted by a polymer compound having a melting point of 180° C. or higher. This allows the fibrous substance to have a framework structure even at a high temperature of 180° C. or more, whereby the fiber-containing polymer film can keep insulation and shutdown characteristics and attain excellent heat resistance.

Preferably, the fibrous substance is constituted by at least one kind of polymer compound selected from the group consisting of polyacrylonitrile, polyimide-imide, polyvinyl alcohol, and polyimide. This allows the fiber-containing polymer film to attain excellent heat resistance and strength.

The present invention provides a method of manufacturing a fiber-containing polymer film comprising a coating material preparing step of preparing a coating material containing a host polymer, a fibrous substance, and a solvent; a coating step of applying the coating material onto a support substrate by extrusion so as to form a coating film; and a polymer film forming step of eliminating the solvent from the coating film so as to form a fiber-containing polymer film.

This method of manufacturing a fiber-containing polymer film applies a coating material containing a host polymer and a fibrous substance by extrusion in the coating step, whereby the fibrous substance can be oriented in a direction substantially parallel to the main surface of the fiber-containing polymer film and in substantially the same direction. Therefore, this method of manufacturing a fiber-containing polymer film can manufacture the fiber-containing polymer film of the present invention that can form a polymer solid electrolyte film having fully lowered impedance with sufficient strength.

Preferably, the coating step is a step of expelling the coating material at an extrusion pressure of 1 to 30 kg/cm² from an outlet having a slit width of at least 10 times an average fiber diameter of the fibrous substance but not more than an average fiber length thereof so that the coating material is applied onto the support substrate and forms the coating film. Applying the coating material under such a condition can orient the fibrous substance in a fixed direction more reliably, whereby the fibrous substance can be oriented in a direction substantially parallel to the main surface of the fiber-containing polymer film and in substantially the same direction over the whole area of the fiber-containing polymer film.

The present invention also provides a method of manufacturing a fiber-containing polymer film comprising a first coating material preparing step of preparing a first coating material containing a host polymer and a solvent; a second coating material preparing step of preparing a second coating material containing a fibrous substance and a dispersant; a first coating step of applying the first coating material onto a support substrate so as to form a first coating film; a second coating step of applying the second coating material onto the first coating film by extrusion so as to form a second coating film; and a polymer film forming step of eliminating the solvent and dispersant from the first and second coating films so as to form a fiber-containing polymer film containing the host polymer and fibrous substance.

This method of manufacturing a fiber-containing polymer film can yield a fiber-containing polymer film having a fibrous substance oriented in a fixed direction on only one main surface side. By applying the second coating material containing the fibrous substance by extrusion in the second coating step, this method of manufacturing a fiber-containing polymer film can orient the fibrous substance in a direction substantially parallel to the main surface of the fiber-containing polymer film and in substantially the same direction. Therefore, this method of manufacturing a fiber-containing polymer film can manufacture the fiber-containing polymer film of the present invention that can form a polymer solid electrolyte film having fully lowered impedance with sufficient strength.

Preferably, the second coating step is a step of expelling the coating material at an extrusion pressure of 1 to 30 kg/cm² from an outlet having a slit width of at least 10 times an average fiber diameter of the fibrous substance but not more than an average fiber length thereof so that the second coating material is applied onto the first coating film and forms the second coating film. Applying the coating material under such a condition can orient the fibrous substance in a fixed direction more reliably, whereby the fibrous substance can be oriented in a direction substantially parallel to the main surface of the fiber-containing polymer film and in substantially the same direction over the whole area of the fiber-containing polymer film.

Preferably, in these methods of manufacturing a fiber-containing polymer film of the present invention, the fibrous substance has an average fiber diameter of 100 to 500 nm and an average fiber length of 10 to 100 µm. The fibrous substance satisfying this condition is easy to orient in a fixed direction and thus can efficiently be oriented in a direction substantially parallel to the main surface of the fiber-containing polymer film and in substantially the same direction. Using the fibrous substance satisfying this condition makes it possible to manufacture a fiber-containing polymer film which improves the strength and lowers the impedance at the same time with a higher level.

Preferably, in the methods of manufacturing a fiber-containing polymer film of the present invention, the fibrous substance is constituted by a polymer compound. This makes it possible to manufacture a fiber-containing polymer film which has both strength and elasticity and can more fully prevent external stresses such as shocks and vibrations from causing cracks.

Preferably, in the methods of manufacturing a fiber-containing polymer film of the present invention, the fibrous substance is constituted by a polymer compound having a melting point of 180° C. or higher. This makes it possible to manufacture a fiber-containing polymer film having excellent heat resistance.

Preferably, in the methods of manufacturing a fiber-containing polymer film of the present invention, the fibrous substance is constituted by at least one kind of polymer compound selected from the group consisting of polyacrylonitrile, polyamide-imide, polyvinyl alcohol, and polyimide. This makes it possible to manufacture the fiber-containing polymer film having excellent heat resistance and strength.

The present invention also provides an electrochemical device comprising a polymer solid electrolyte film constructed by impregnating the fiber-containing polymer film of the present invention with an electrolyte salt. This electrochemical device can fully lower the impedance since it includes the polymer solid electrolyte film using the fiber-containing polymer film of the present invention, and can achieve excellent safety because of the excellent strength in the polymer solid electrolyte film.

The present invention further provides a method of manufacturing an electrochemical device comprising the steps of forming a fiber-containing polymer film by the method of manufacturing a fiber-containing polymer film of the present invention and impregnating the fiber-containing polymer film with an electrolyte salt. This method of manufacturing an electrochemical device can manufacture the electrochemical device of the present invention, which has fully lowered impedance because of the fiber-containing polymer film formed by the method of manufacturing a fiber-containing polymer film of the present invention and superb safety resulting from the excellent strength of the polymer solid electrolyte film.

As in the foregoing, the present invention can provide a fiber-containing polymer film and a method of manufacturing the same which can yield a polymer solid electrolyte film having fully lowered impedance with sufficient strength, and an electrochemical device and a method of manufacturing the same.

DESCRIPTION OF THE PREFERRED EMBODIMENTS

Figure 1:
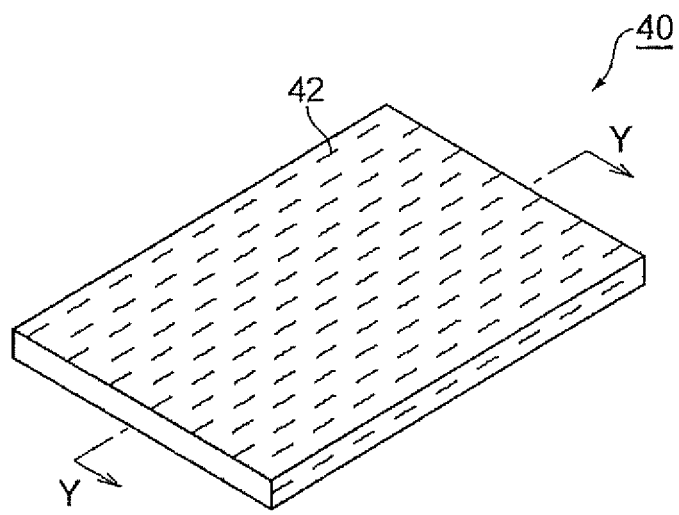
FIG. 1 is a perspective view schematically illustrating a preferred embodiment of the fiber-containing polymer film of the present invention.

In the following, preferred embodiments of the present invention will be explained in detail with reference to the drawings. In the drawings, the same or equivalent parts will be referred to with the same signs while omitting their overlapping descriptions. Ratios of dimensions in the drawings are not limited to those illustrated.

Fiber-Containing Polymer Film and Method of Manufacturing Same

The fiber-containing polymer film of the present invention contains a host polymer and fibrous substances, and has an orientation area where the fibrous substances are oriented in a direction substantially parallel to a main surface of the fiber-containing polymer film and in substantially the same direction.

Figure 2:
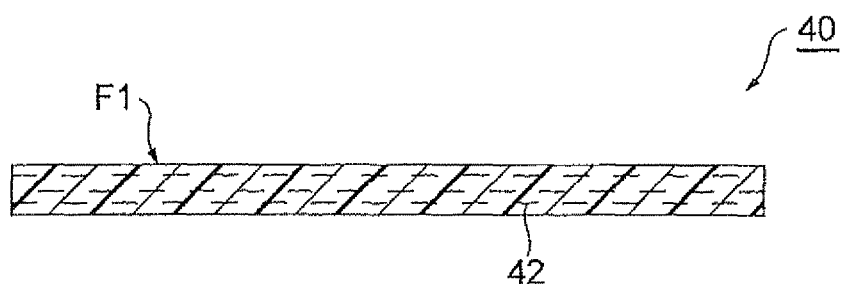
FIG. 2 is a schematic sectional view of the fiber-containing polymer film taken along the line Y-Y of FIG. 1.

FIG. 1 is a perspective view schematically illustrating a preferred embodiment of the fiber-containing polymer film of the present invention. FIG. 2 is a schematic sectional view of a cross section obtained when the fiber-containing polymer film 40 of FIG. 1 is cut along the line Y-Y. As illustrated in FIGS. 1 and 2, fibrous substances 42 in the fiber-containing polymer film 40 are oriented in a direction substantially parallel to a main surface F1 of the fiber-containing polymer film 40 and in substantially the same direction.

Figure 3:
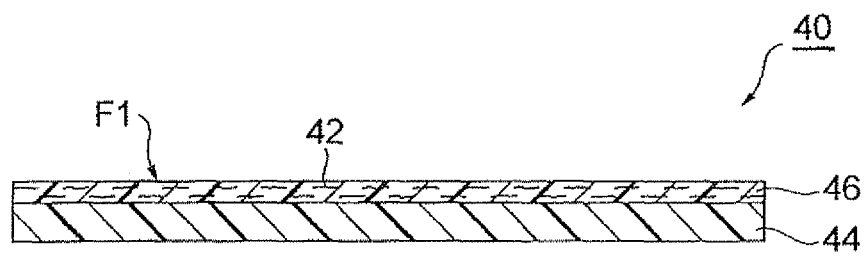
FIG. 3 is a schematic sectional view illustrating another preferred embodiment of the fiber-containing polymer film of the present invention.

FIG. 3 is a schematic sectional view illustrating another preferred embodiment of the fiber-containing polymer film of the present invention. The fiber-containing polymer film 40 illustrated in FIG. 3 is constituted by a polymer layer 44 which contains a host polymer but no fibrous substance 42, and a fiber layer 46 which is laminated on the polymer layer 44 and contains fibrous substances 42. It is not necessary for the polymer layer 44 and fiber layer 46 to be clearly separated into two layers. For example, an area containing the fibrous substances 42 may be formed partly in the polymer layer 44.

It is necessary for the fiber-containing polymer film 40 of the present invention to have an orientation area where the fibrous substances 42 are oriented in the predetermined direction mentioned above. Preferably, as illustrated in FIGS. 1 to 3, the fiber-containing polymer film 40 as a whole is an orientation area, while all the fibrous substances 42 are oriented in the predetermined direction.

That the fibrous substances 42 are oriented in a direction substantially parallel to the main surface F1 of the fiber-containing polymer film 40 refers to a state where that the fiber length directions of the fibrous substances 42 are mostly parallel to the main surface F1 so that there is no fiber oriented more perpendicular than parallel. The fiber length direction of each fibrous substance 42 is not required to be completely parallel to the main surface F1 but may form an angle of about ±10° or less, preferably ±5° or less, with the main surface F1. That all the fibrous substances 42 are oriented in the predetermined direction refers to a state where the fiber length directions of the fibrous substances 42 are mostly oriented in the same direction so that there is no fiber intersecting another fiber at an angle near a right angle. It is not necessary for all the fibers to be oriented completely in the same direction; the fibers may intersect each other at an angle of about 10° or less, preferably 5° or less.

When the fibrous substances 42 are oriented in a direction substantially parallel to the main surface F1 of the fiber-containing polymer film 40, the thickness of the fiber-containing polymer film 40 tends to fluctuate less in the measurement of thickness under constant load. On the other hand, when the fibrous substances 42 are arranged randomly or oriented perpendicular to the main surface F1 of the fiber-containing polymer film 40, the thickness of the fiber-containing polymer film 40 tends to fluctuate more.

Examples of the host polymer include polyvinylidene fluoride (PVDF), fluorine rubbers (such as VDF-HFP, VDF-HFP-TFE, and VDF-CTFE), and polyethylene oxide. Among them, polyvinylidene fluoride is preferred because of its wide potential window.

The fibrous substances 42 are preferably those constituted by a polymer compound, more preferably polymer fibers having a melting point of 180° C. or higher. Specific examples of materials for the fibrous substances 42 include polyacrylonitrile (PAN), polyamide-imide (PAI), polyvinyl alcohol (PVA), and polyimide (PI). Among them, polyacrylonitrile is preferred from the viewpoint of heat resistance.

The average fiber diameter of the fibrous substances 42 is preferably 100 to 500 nm, more preferably 200 to 300 nm. When the average fiber diameter is less than 100 nm, the strength of the fiber-containing polymer film 40 tends to decrease. When the average fiber diameter exceeds 500 nm, micropores in the fiber-containing polymer film 40 increase their diameters, whereby its self-discharge characteristic tends to lower.

The average fiber length of the fibrous substances 42 is preferably 10 to 100 μm, more preferably 50 to 100 μm. The strength of the fiber-containing polymer film 40 tends to decrease when the average fiber length is less than 10 μm, while the fluidity of a coating material at the time of forming a film may lower when the average fiber length exceeds 100 μm.

The aspect ratio (fiber length/fiber diameter) of the fibrous substances 42 is preferably at least 10, more preferably at least 100, further preferably 200 to 300. When the aspect ratio is less than 10, the strength of the fiber-containing polymer film 40 tends to decrease.

The average fiber diameter, average fiber length, and aspect ratio of the fibrous substances 42 are calculated as average values from fiber diameters, fiber lengths, and aspect ratios measured in 10 fibers in a scanning electron microgram (SEM) of the fibrous substances 42.

In the fiber-containing polymer film 40, the content of the fibrous substances 42 is preferably 10 to 50% by volume, more preferably 25 to 45% by volume, based on the total volume of the fiber-containing polymer film 40 from the viewpoint of securing interstices for transmitting ions and attaining the strength and heat resistance resulting from the presence of fibers.

The fiber-containing polymer film 40 may further contain inorganic particles such as those of alumina and silica. The fiber-containing polymer film 40 can more fully lower its impedance by containing inorganic particles therein.

A method of manufacturing the fiber-containing polymer film 40 of the present invention will now be explained. The method of manufacturing the fiber-containing polymer film 40 in accordance with the first embodiment, which is a method of manufacturing the fiber-containing polymer film 40 illustrated in FIG. 2, comprises a coating material preparing step of preparing a coating material containing a host polymer, fibrous substances, and a solvent; a coating step of applying the coating material onto a support substrate by extrusion so as to form a coating film; and a polymer film forming step of eliminating the solvent from the coating film so as to form a fiber-containing polymer film.

The solvent used in the coating material preparing step is not limited in particular as long as it can dissolve or disperse the host polymer and disperse the fibrous substances. Examples of the solvent include acetone, MEK (methyl ethyl ketone), NMP (N-methyl-2-pyrrolidone), and DMF.

Figure 4:
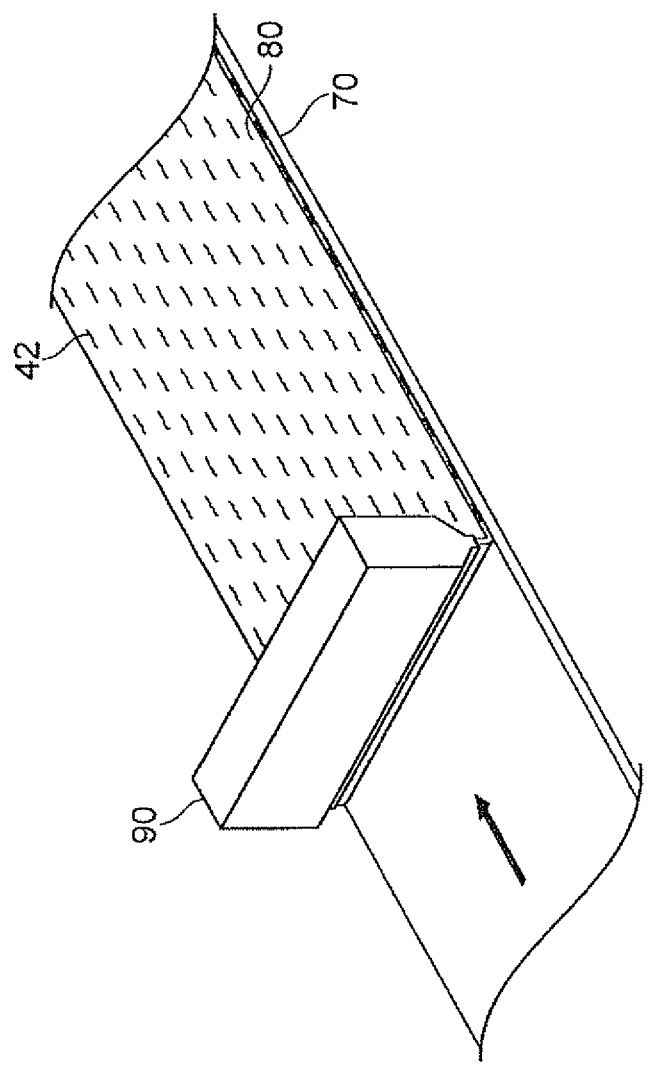
FIG. 4 is a perspective view schematically illustrating a coating step by extrusion.
Figure 5:
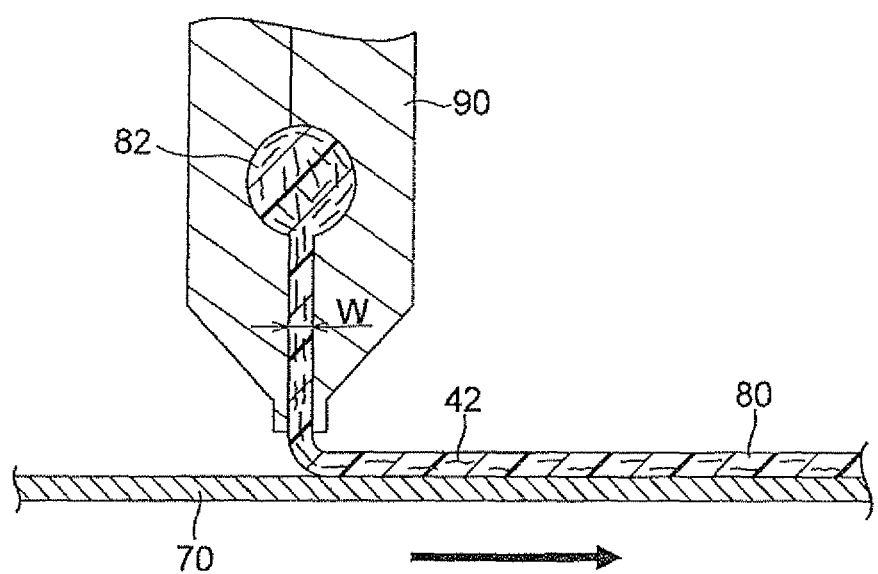
FIG. 5 is a sectional view schematically illustrating the coating step by extrusion.

The coating step is a step of applying the coating material onto a support substrate by extrusion. FIG. 4 is a perspective view schematically illustrating the coating step by extrusion. FIG. 5 is a sectional view schematically illustrating the coating step by extrusion. In the coating step, as illustrated in FIGS. 4 and 5, a coating material 82 is expelled from a nozzle 90 onto a support substrate 70, so as to form a coating film 80. Thus applying the coating material 82 by extrusion generates a flow of the coating material 82 in a fixed direction, along which the fibrous substances 42 are arranged, whereby the fibrous substances 42 are oriented in a direction substantially parallel to a main surface of the coating film 80 and in substantially the same direction.

The support substrate 70 is not limited in particular. For example, a metal foil or a resin sheet made of polyethylene terephthalate (PET) can be used.

Though the coating condition of the coating material 82 is not limited in particular as long as the fibrous substances 42 are oriented sufficiently, it will be preferred if an outlet of the nozzle 90 illustrated in FIG. 5 has a slit width W which is at least 10 times the average fiber diameter of the fibrous substances 42 but not more than the average fiber length thereof, while the coating material 82 is expelled at an extrusion pressure of 1 to 30 kg/cm$^2$. Performing the coating step under this condition can more reliably orient the fibrous substances 42 in a direction substantially parallel to a main surface of the coating film 80 and in substantially the same direction. While being at least 10 times the average fiber diameter of the fibrous substances 42 but not more than the average fiber length thereof, the slit width W preferably falls within the range of 10 to 100 more preferably within the range of 30 to 50 μm. The extrusion pressure is more preferably 5 to 10 kg/cm$^2$.

In the polymer film forming step, the solvent can be eliminated from the coating film 80 by heating to 60 to 120° C. within a drying furnace, for example.

The above-mentioned fiber-containing polymer film 40 can be manufactured through the foregoing steps.

The method of manufacturing the fiber-containing polymer film 40 in accordance with the second embodiment, which is a method of manufacturing the fiber-containing polymer film 40 illustrated in FIG. 3, comprises a first coating material preparing step of preparing a first coating material containing a host polymer and a solvent; a second coating material preparing step of preparing a second coating material containing fibrous substances and a dispersant; a first coating step of applying the first coating material onto a support substrate so as to form a first coating film; a second coating step of applying the second coating material onto the first coating film by extrusion so as to form a second coating film; and a polymer film forming step of eliminating the solvent and dispersant from the first and second coating films so as to form a fiber-containing polymer film containing the host polymer and fibrous substances.

In this manufacturing method, the first and second coating steps produce the polymer layer 44 containing the host polymer and no fibrous substances 42 and the fiber layer 46 containing the fibrous substances 42, respectively.

The solvent used in the first coating material preparing step is not limited in particular as long as it can dissolve or disperse the host polymer. Examples of the solvent include acetone, MEK (methyl ethyl ketone), NMP (N-methyl-2-pyrrolidone), and DMF.

The dispersant used in the second coating material preparing step is not limited in particular as long as it can disperse the fibrous substances 42. Examples of the dispersant include toluene, acetone, NMP (N-methyl-2-pyrrolidone), MEK (methyl ethyl ketone), DMF, and BCS (butyl cellosolve).

Though the coating method in the first coating step is not limited in particular, the coating is preferably performed by extrusion as in the second coating step.

The second coating step is a step of applying the second coating material onto the first coating film by extrusion. The second coating step is performed under the same condition as with the coating step in the first embodiment except for using the second coating material.

After forming the second coating film on the first coating film, they may be bonded together under pressure by calendering or the like. The steps other than those mentioned above can be performed under the same conditions as with their equivalent steps in the first embodiment. This can form the fiber-containing polymer film 40 having the fibrous substances 42 oriented in a direction substantially parallel to the main surface of the fiber-containing polymer film 40 and in substantially the same direction only in an upper layer part of the fiber-containing polymer film 40.

Electrochemical Device and Method of Manufacturing Same

Figure 6:
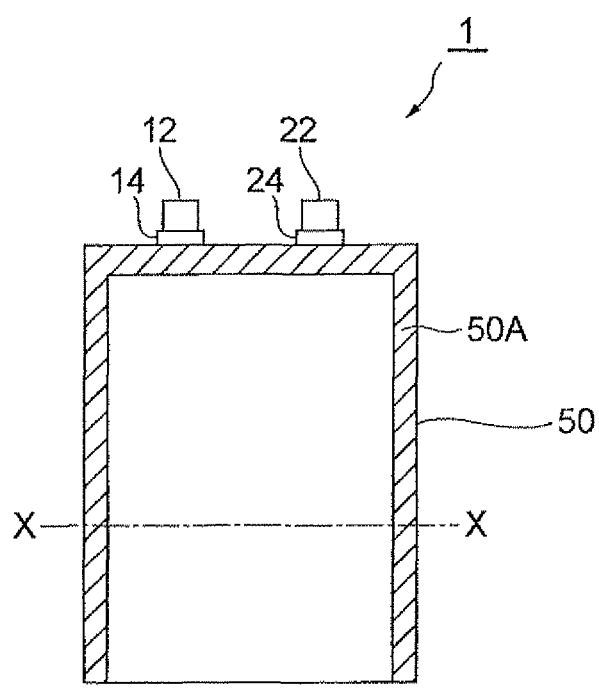
FIG. 6 is a front view of a lithium-ion secondary battery which is a preferred embodiment of the electrochemical device of the present invention.
Figure 7:
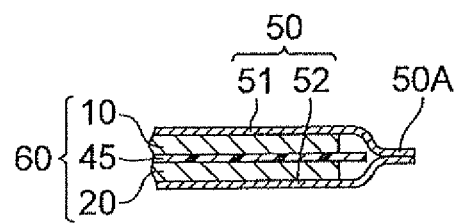
FIG. 7 is a schematic sectional view of the lithium-ion secondary battery taken along the line X-X of FIG. 6.

FIG. 6 is a front view of a lithium-ion secondary battery 1 which is a preferred embodiment of the electrochemical device of the present invention. FIG. 7 is a schematic view of a cross section of the lithium-ion secondary battery 1 cut along the line X-X of FIG. 6.

As illustrated in FIGS. 6 and 7, the lithium-ion secondary battery 1 is mainly constituted by a power generating element 60 comprising a planar negative electrode 10 and a planar positive electrode 20 which oppose each other and a polymer solid electrolyte film 45 arranged between and adjacent to the negative electrode 10 and positive electrode 20, a case 50 accommodating them in a closed state, a negative electrode lead 12 having one end part electrically connected to the negative electrode 10 and the other end part projecting out of the case 50, and a positive electrode lead 22 having one end part electrically connected to the positive electrode 20 and the other end part projecting out of the case 50. For the polymer solid electrolyte film 45, one formed by causing the above-mentioned fiber-containing polymer film 40 of the present invention to contain an electrolyte salt is used.

In this specification, the "negative electrode", which is based on the polarity of the battery at the time of discharging, refers to an electrode which releases electrons by an oxidation reaction at the time of discharging. The "positive electrode", which is based on the polarity of the battery at the time of discharging, refers to an electrode which receives electrons by a reduction reaction at the time of discharging.

Figure 8:
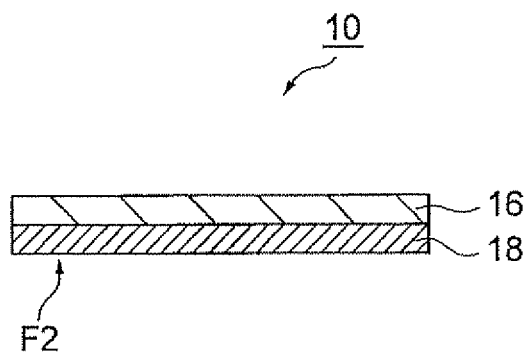
FIG. 8 is a schematic sectional view illustrating an example of basic structures of a negative electrode in the lithium-ion secondary battery.
Figure 9:
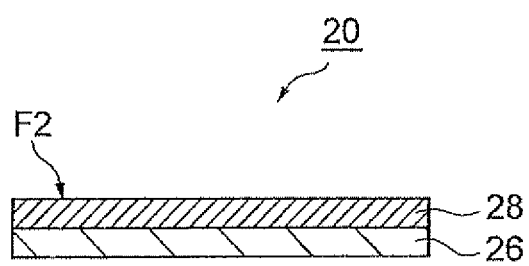
FIG. 9 is a schematic sectional view illustrating an example of basic structures of a positive electrode in the lithium-ion secondary battery.

FIG. 8 is a schematic sectional view illustrating an example of basic structures of the negative electrode 10 in the lithium-ion secondary battery 1. FIG. 9 is a schematic sectional view illustrating an example of basic structures of the positive electrode 20 in the lithium ion secondary battery 1.

As illustrated in FIG. 8, the negative electrode 10 is constituted by a current collector 16 and a negative electrode active material layer 18 formed on the current collector 16. As illustrated in FIG. 9, the positive electrode 20 is constituted by a current collector 26 and a positive electrode active material layer 28 formed on the current collector 26.

The current collectors 16, 26 are not limited in particular as long as they are good conductors which can sufficiently transfer electric charges to the negative and positive electrode active material layers 18, 28, respectively; known current collectors employed in lithium-ion secondary batteries can be used. Examples of the current collectors 16, 26 include metal foils made of copper and aluminum, respectively.

The negative electrode active material layer 18 of the negative electrode 10 is mainly constituted by a negative electrode active material and a binder. Preferably, the negative electrode active material layer 18 further contains a conductive auxiliary.

The negative electrode active material is not limited in particular as long as it allows occlusion and release of lithium ions, desorption and insertion (intercalation) of lithium ions, or doping and undoping of lithium ions and their counteranions (e.g., $PF_6^-$ and $ClO_4^-$) to proceed reversibly; known negative electrode active materials can be used. Examples of the negative electrode active material include carbon materials such as natural graphite, synthetic graphite, non-graphitizing carbon, graphitizable carbon, and low-temperature-firable carbon; metals such as Al, Si, and Sn which are combinable with lithium; amorphous compounds mainly composed of oxides such as SiO, $SiO_2$, $SiO_x$, and $SnO_2$; lithium titanate ($Li_4Ti_5O_{12}$); and $TiO_2$.

As the binder used in the negative electrode 10, known binders can be employed without any restrictions in particular. Examples include fluororesins such as polyvinylidene fluoride (PVDF), polytetrafluoroethylene (PTFE), tetrafluoroethylene/hexafluoropropylene copolymers OP), tetrafluoroethylene/perfluoroalkylvinyl ether copolymers (PFA), ethylene/tetrafluoroethylene copolymers (EE), polychlorotrifluoroethylene (PCTFE), ethylene/chlorotrifluoroethylene copolymers (KITE), and polyvinyl fluoride (PVF). The binder not only binds constituent materials such as active material particles, the conductive auxiliary added when necessary, and the like together, but also contributes to binding these constituent materials to the current collector.

Other examples of the binder include fluorine rubbers based on vinylidene fluoride such as fluorine rubbers based on vinylidene fluoride/hexafluoropropylene (VDF/HFP-based fluorine rubbers).

Still other examples of the binder include polyethylene, polypropylene, polyethylene terephthalate, aromatic polyamides, cellulose, styrene/butadiene rubber, isoprene rubber, butadiene rubber, and ethylene/propylene rubber. Also employable are thermoplastic elastomeric polymers such as styrene/butadiene/styrene block copolymers and hydrogenated derivatives thereof, styrene/ethylene/butadiene/styrene copolymers, and styrene/isoprene/styrene block copolymers and hydrogenated derivatives thereof. Further employable are syndiotactic 1,2-polybutadiene, ethylene/vinyl acetate copolymers, propylene-α-olefin (having a carbon number of 2 to 12) copolymers, and the like. Conductive polymers may also be used.

As the conductive auxiliary used when necessary, known conductive auxiliaries can be employed without any restrictions in particular. Examples include carbon blacks, carbon materials, fine powders of metals such as copper, nickel, stainless steel, and iron, mixtures of the carbon materials and fine metal powders, and conductive oxides such as ITO.

The content of the negative electrode active material in the negative electrode active material layer 18 is preferably 80 to 97% by mass, more preferably 85 to 96% by mass, based on the total amount of the negative electrode active material layer 18. When the active material content is less than 80% by mass, the energy density tends to become lower than that in the case where the content falls within the range mentioned above. When the active material content exceeds 97% by mass, the bonding force tends to become weaker, thereby lowering the cycle characteristic as compared with the case where the content falls within the range mentioned above.

The positive electrode active material layer 28 is mainly constituted by a positive electrode active material and a binder. Preferably, the positive electrode active material layer 28 further contains a conductive auxiliary.

The positive electrode active material is not limited in particular as long as it allows occlusion and release of lithium ions, desorption and insertion (intercalation) of lithium ions, or doping and undoping of lithium ions and their counteranions $ClO_4^-$) to proceed reversibly; known positive electrode active materials can be used. Examples of the positive electrode active material include lithium cobaltate ($LiCoO_2$), lithium nickelate ($LiNiO_2$), lithium manganese spinel ($LiMn_2O_4$), mixed metal oxides expressed by the general formula of $LiNi_xCo_yMn_zM_aO_2$ (where x+y+z+a=1, 0≤x≤1, 0≤y≤1, 0≤z≤1, 0≤a≤1, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn, Fe, Mg, Nb, Ti, Al, and Zr, or VO), and mixed metal oxides such as lithium titanate ($Li_4Ti_5O_{12}$).

As the binder used in the positive electrode 20, one similar to the binder used in the negative electrode 10 can be employed. As the conductive auxiliary used in the positive electrode 20 when necessary, one similar to the conductive auxiliary used in the negative electrode 10 can be employed.

The current collector 26 of the positive electrode 20 is electrically connected to one end of the positive electrode lead 22 made of aluminum, for example, while the other end of the positive electrode lead 22 extends to the outside of the case 50. On the other hand, the current collector 16 of the negative electrode 10 is electrically connected to one end of the negative electrode lead 12 made of copper or nickel, for example, while the other end of the negative electrode lead 12 extends to the outside of the case 50.

The part of the negative electrode lead 12 in contact with a seal part 50A is covered with an insulator 14 for preventing the negative electrode lead 12 from coming into contact with a metal layer of the case 50. The part of the positive electrode lead 22 in contact with the seal part 50A is covered with an insulator 24 for preventing the positive electrode lead 22 from coming into contact with the metal layer of the case 50. The insulators 14, 24 also serve to improve the adhesion between the innermost layer of the case 50 and the leads 12, 22.

The polymer solid electrolyte film 45 arranged between the negative electrode 10 and positive electrode 20 has ion permeability and electronic insulativeness. As the polymer solid electrolyte film 45, one formed by causing the above-mentioned fiber-containing polymer film 40 of the present invention to contain an electrolyte salt is used.

The electrolytic salt for use is appropriately selected according to the kind of the electrochemical device. When the electrochemical device is a lithium-ion secondary battery, for example, a lithium salt such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, or $LiN(CF_3CF_2CO)_2$ is used.

The electrolyte salt may be contained in a state where the fiber-containing polymer film 40 is impregnated with an electrolytic solution in which the electrolyte salt is dissolved in a solvent. As the solvent in this case, one used in known electrochemical devices can be employed. Preferred examples include organic solvents such as propylene carbonate, ethylene carbonate, and diethyl carbonate. They may be used either singly or in mixtures of two or more at any ratios. The electrolytic solution may be gelled by addition of polymers and the like thereto.

Specific examples of methods of causing the fiber-containing polymer film 40 to contain the electrolyte salt include (i) a method comprising causing the fiber-containing polymer film 40 to contain the above-mentioned electrolyte solution while keeping a vacuum state, and then leaving them as they stand (for about one night, for example) such that the film is sufficiently impregnated with the electrolytic solution; and (ii) a method comprising causing the fiber-containing polymer film 40 to contain a predetermined amount of the electrolytic solution while keeping a vacuum state, and then immediately pressurizing them (at about 2 $kg/cm^2$, for example) so as to push the electrolytic solution into micropores.

The polymer solid electrolyte film 45 formed by causing the fiber-containing polymer film 40 to contain the electrolyte salt may be made either before laminating it with the negative electrode 10 and positive electrode 20, or by laminating the fiber-containing polymer film 40 with the negative electrode 10 and positive electrode 20, inserting thus obtained laminate into the case 50, and then impregnating the fiber-containing polymer film 40 with the electrolytic solution.

As illustrated in FIG. 7, the case 50 is formed by a pair of opposing films (first and second films 51, 52). Edge parts of films opposing and overlapping each other are sealed with an adhesive or by heat-sealing, so as to faun the seal part 50A.

The film constituting the first and second films 51, 52 is a flexible film. Though this film is not limited in particular as long as it is a flexible film, it preferably has at least an innermost layer made of a polymer in contact with the power generating element 60 and a metal layer arranged on the side of the innermost layer opposite from the side in contact with the power generating element from the viewpoint of effectively preventing moisture and air from entering the inside of the case 50 from the outside and electrolyte components from dissipating from the inside to the outside of the case 50, while securing sufficient mechanical strength and lightweight of the case.

A method of manufacturing the above-mentioned lithium-ion secondary battery 1 will now be explained.

For making the power generating element 60 (multilayer body in which the negative electrode 10, polymer solid electrolyte film 45, and positive electrode 20 are laminated in this order), known methods employed for manufacturing lithium-ion secondary batteries can be used without any restrictions in particular.

First, when making the negative and positive electrodes 10, 20, the constituents mentioned above are mixed and dispersed into a solvent in which the binder is soluble, so as to produce an electrode forming coating liquid (slurry, paste, or the like). The solvent is not limited in particular as long as the binder is soluble therein; examples include N-methyl-2-pyrrolidone and N,N-dimethylformamide.

Subsequently, the electrode forming coating liquid is applied onto a current collector surface, dried, and extended, so as to form an active material containing layer on the current collector, thereby completing the making of the negative and positive electrodes 10, 20. The technique for applying the electrode forming coating liquid to the current collector surface is not limited in particular, but may be determined as appropriate according to the material, form, and the like of the current collector. Examples of the coating method include metal mask printing, electrostatic coating, dip coating, spray coating, roll coating, doctor blading, gravure coating, and screen printing.

Thereafter, the negative and positive leads 12, 22 are electrically connected to thus prepared negative and positive electrodes 10, 20, respectively.

Subsequently, the polymer solid electrolyte film 45 is arranged between and in contact with the negative electrode 10 and positive electrode 20 (preferably in an unbonded state), so as to complete the power generating element 60. Here, a surface F2 of the negative electrode 10 facing the negative electrode active material layer 18 and a surface F2 of the positive electrode 20 facing the positive electrode active material layer 28 are arranged in contact with the polymer solid electrolyte film 45. The power generating element 60 may be made by using the fiber-containing polymer film 40 containing no electrolytic solution instead of the polymer solid electrolyte film 45, and the fiber-containing polymer film 40 may be caused to contain the electrolytic solution in a later step, so as to form the polymer solid electrolyte film 45.

Next, the edge parts of the first and second films 51, 52 overlaid on each other are sealed with an adhesive or by heat sealing, so as to make the case 50. Here, for securing an opening for introducing the power generating element 60 into the case 50 in a later step, a part of the edge parts is left unsealed. Then the case 50 having the opening is yielded.

Then, the power generating element 60 having the negative and positive electrode leads 12, 22 electrically connected thereto is inserted into the case 50 having the opening. When the fiber-containing polymer film 40 is used in the power generating element 60, the electrolytic solution containing the electrolytic salt is injected into the case 50 through the opening, so as to cause the fiber-containing polymer film 40 to contain the electrolytic solution, thereby forming the polymer solid electrolyte film 45. Then, while the negative and positive electrodes 12, 22 are partly inserted in the case 50, the opening of the case 50 is sealed, whereby the lithium-ion secondary battery 1 is completed.

Though a preferred embodiment of the present invention is explained in the foregoing, the present invention is not limited thereto.

For example, though the above-mentioned embodiment explains the lithium-ion secondary battery 1 comprising one each of the negative and positive electrodes 10, 20, two or more each of the negative and positive electrodes 10, 20 may be provided while always arranging one polymer solid electrolyte film 45 between each pair of the negative and positive electrodes 10, 20. The lithium-ion secondary battery 1 is not limited to the form illustrated in FIG. 6, but may have a cylindrical form, for example.

Though the above-mentioned embodiment explains a case where the electrochemical device is a lithium-ion secondary battery, the electrochemical device of the present invention is not limited to the lithium-ion secondary battery, but may also be any of secondary batteries, other than the lithium-ion secondary batteries, such as metal lithium secondary batteries and electrochemical capacitors such as lithium capacitors. The electrochemical device of the present invention can also be used for power supplies for self-propelled micromachines, IC cards, and the like and decentralized power supplies placed on or within printed boards. In the electrochemical devices other than the lithium-ion secondary batteries, it will be sufficient if active materials suitable for the respective electrochemical devices are used.

EXAMPLES

The present invention will be explained more specifically with reference to examples and comparative examples. However, the present invention is not limited to the following examples.

Example 1

A coating material was prepared by mixing 30 parts by volume of polyvinylidene fluoride (product name: Kynar 2801 manufactured by Atofina) as a host polymer, 20 parts by volume of polyacrylonitrile (PAN) fibers (having an average fiber diameter of 300 nm and an average fiber length of 70 μm) as fibrous substances, and 50 parts by volume of acetone as a solvent and then further mixing them with 15 parts by volume of BCS as a poor solvent.

The coating material was applied by extrusion onto a PET film serving as a support substrate, and then the solvents were eliminated by drying at 100° C., whereby a fiber-containing polymer film (having a thickness of 25 μm) was formed. Here, an applicator having a nozzle with a slit width of 40 μm was used with an extrusion pressure of 6 kg/cm$^2$.

Thus obtained fiber-containing polymer film was peeled off from the support substrate and observed with a scanning electron microscope (SEM), whereby it was seen that the PAN fibers were oriented in a direction substantially parallel to a main surface of the fiber-containing polymer film and in substantially the same direction. When variations in thickness were measured at 10 points in the fiber-containing polymer film by using a constant-pressure (about 100 g) caliper, the variation R (the maximum measured value–the minimum measured value) was 2 μm.

Examples 2 to 21

Fiber-containing polymer films of Examples 2 to 21 were formed as with Example 1 except that the average fiber diameter and average fiber length of PAN fibers used when preparing the coating material and the slit width of the nozzle and extrusion pressure at the time of applying the coating material were changed as listed in the following Table 1.

The fiber-containing polymer films obtained by Examples 2 to 21 were peeled off from their support substrates and observed with the scanning electron microscope (SEM), whereby it was seen in each of them that the PAN fibers were oriented in a direction substantially parallel to a main surface of the fiber-containing polymer film and in substantially the same direction. When variations in thickness were measured at 10 points in each of the fiber-containing polymer films by using the constant-pressure (about 100 g) caliper, the variation R (the maximum measured value–the minimum measured value) was 2 μm.

Example 22

A first coating material was prepared by mixing 30 parts by volume of polyvinylidene fluoride (product name: Kynar 2801 manufactured by Atofina) as a host polymer and 50 parts by volume of acetone as a solvent and then further mixing them with 15 parts by volume of BCS as a poor solvent.

A second coating material was prepared by mixing 30 parts by volume of polyacrylonitrile (PAN) fibers (having an average fiber diameter of 300 nm and an average fiber length of 70 μm) as fibrous substances and 50 parts by volume of acetone as a dispersant.

The first coating material was applied by extrusion onto a PET film serving as a support substrate, so as to form a first coating film. Subsequently, the second coating material is applied by extrusion onto the first coating film. Thereafter, the solvents and dispersant were eliminated from the first and second coating films by drying at 100° C., so as to faun a fiber-containing polymer film (having a thickness of 25 μm) which was a complex of a polymer layer made of the first coating film and a fiber layer made of the second coating film. Here, the slit width of the nozzle of the applicator was 40 μm, while its extrusion pressure was 6 kg/cm$^2$.

Thus obtained fiber-containing polymer film was peeled off from the support substrate and observed with a scanning electron microscope (SEM), whereby it was seen that the PAN fibers were oriented in a direction substantially parallel to a main surface of the fiber-containing polymer film and in substantially the same direction. When variations in thickness were measured at 10 points in the fiber-containing polymer film by using the constant-pressure (about 100 g) caliper, the variation R (the maximum measured value–the minimum measured value) was 2 μm.

Examples 23 to 30

Fiber-containing polymer films of Examples 23 to 30 were formed as with Example 1 except that the amount of PAN fibers contained in the fiber-containing polymer film was changed as listed in the following Table 1.

The fiber-containing polymer films obtained by Examples 23 to 30 were peeled off from their support substrates and observed with the scanning electron microscope (SEM), whereby it was seen in each of them that the PAN fibers were oriented in a direction substantially parallel to a main surface of the fiber-containing polymer film and in substantially the same direction. In particular, it was seen that the PAN fibers exhibited a high degree of parallelism to the main surface of the fiber-containing polymer film and a high degree of orientation to the same direction when the content of PAN fibers fell within the range of 10 to 50%. The PAN fibers were seen to exhibit higher parallelism to the main surface of the fiber-containing polymer film and higher orientation to the same direction when the content of the PAN fibers fell within the range of 25 to 45%. When variations in thickness were measured at 10 points in each of the fiber-containing polymer films by using the constant-pressure (about 100 g) caliper, the variation R (the maximum measured value–the minimum measured value) was 2 μm.

Comparative Example 1

A coating material was prepared by mixing 30 parts by volume of polyvinylidene fluoride (product name: Kynar 2801 manufactured by Atofina) as a host polymer, 20 parts by volume of polyacrylonitrile (PAN) fibers (with an average fiber diameter of 300 nm and an average fiber length of 70 μm) as fibrous substances, and 50 parts by volume of acetone as a solvent and then further mixing them with 15 parts by volume of BCS as a poor solvent.

The coating material was applied by doctor blading onto a PET film serving as a support substrate, and then the solvents were eliminated by drying at 100° C., whereby a fiber-containing polymer film (having a thickness of 25 μm) was allied.

Thus obtained fiber-containing polymer film was peeled of from the support substrate and observed with a scanning electron microscope (SEM), whereby it was seen that the PAN fibers were arranged randomly. When variations in thickness were measured at 10 points in the fiber-containing polymer film by using a constant-pressure (about 100 g) caliper, the variation R (the maximum measured value−the minimum measured value) was 4 μm.

by Denki Kagaku Kogyo K.K.) as a conductive auxiliary were dispersed in NMP, so as to prepare a negative electrode coating material.

Making of a Positive Electrode

The positive electrode coating material was applied to a surface of a sheet-like current collector made of aluminum, so as to form a positive electrode coating film. The amount of the positive electrode coating material applied to the current collector was adjusted such that the mass of the active material particle carried by the current collector per unit area was 10.0 mg/cm$^2$. Thereafter, thus obtained product was extended at a processing linear pressure of 300 kgf/cm, so as to form a positive electrode roll, which was then punched out into a piece having a length of 100 mm and a width of 142 mm with a blanking die, so as to yield a positive electrode.

Making of a Negative Electrode

A negative electrode was formed by the same method as with the positive electrode except that the negative electrode

TABLE 1

|  | Fiber | | Nozzle slit width [μm] | Extrusion pressure [kg/cm$^2$] | Fiber-containing polymer film thickness [μm] | Fiber orientation | Fiber content [vol %] |
| --- | --- | --- | --- | --- | --- | --- | --- |
|  | Average diameter [nm] | Average length [μm] |  |  |  |  |  |
| Example 1 | 300 | 70 | 40 | 6 | 25 | parallel | 40 |
| Example 2 | 300 | 10 | 40 | 6 | 25 | parallel | 40 |
| Example 3 | 300 | 20 | 40 | 6 | 25 | parallel | 40 |
| Example 4 | 100 | 70 | 40 | 6 | 25 | parallel | 40 |
| Example 5 | 200 | 70 | 40 | 6 | 25 | parallel | 40 |
| Example 6 | 300 | 70 | 10 | 30 | 25 | parallel | 40 |
| Example 7 | 300 | 70 | 20 | 20 | 25 | parallel | 40 |
| Example 8 | 300 | 70 | 30 | 10 | 25 | parallel | 40 |
| Example 9 | 300 | 70 | 50 | 5 | 25 | parallel | 40 |
| Example 10 | 300 | 70 | 70 | 2 | 25 | parallel | 40 |
| Example 11 | 300 | 70 | 100 | 1 | 25 | parallel | 40 |
| Example 12 | 400 | 70 | 40 | 6 | 25 | parallel | 40 |
| Example 13 | 500 | 70 | 40 | 6 | 25 | parallel | 40 |
| Example 14 | 300 | 100 | 40 | 13 | 25 | parallel | 40 |
| Example 15 | 300 | 70 | 40 | 13 | 25 | parallel | 40 |
| Example 16 | 90 | 70 | 40 | 6 | 25 | parallel | 40 |
| Example 17 | 300 | 5 | 40 | 6 | 25 | parallel | 40 |
| Example 18 | 300 | 70 | 5 | 35 | 25 | parallel | 40 |
| Example 19 | 300 | 70 | 110 | 0.5 | 25 | parallel | 40 |
| Example 20 | 300 | 110 | 40 | 13 | 25 | parallel | 40 |
| Example 21 | 550 | 70 | 40 | 13 | 25 | parallel | 40 |
| Example 22 | 300 | 70 | 40 | 6 | 25 | parallel | 40 |
| Example 23 | 300 | 70 | 40 | 6 | 25 | parallel | 5 |
| Example 24 | 300 | 70 | 40 | 6 | 25 | parallel | 10 |
| Example 25 | 300 | 70 | 40 | 6 | 25 | parallel | 20 |
| Example 26 | 300 | 70 | 40 | 6 | 25 | parallel | 25 |
| Example 27 | 300 | 70 | 40 | 6 | 25 | parallel | 30 |
| Example 28 | 300 | 70 | 40 | 6 | 25 | parallel | 45 |
| Example 29 | 300 | 70 | 40 | 6 | 25 | parallel | 50 |
| Example 30 | 300 | 70 | 40 | 6 | 25 | parallel | 55 |
| Comp. Ex. 1 | 300 | 70 | — | — | 25 | random | 40 |

Making of Lithium-Ion Secondary Battery

Preparation of a Positive Electrode Coating Material

An active material particle made of lithium cobaltate (LiCoO$_2$) (product name: Selion manufactured by Seimi Chemical Co., Ltd.), PVDF as a binder, and carbon black (product name: DAB manufactured by Denki Kagaku Kogyo K.K.) as a conductive auxiliary were dispersed in NMP, so as to prepare a positive electrode coating material.

Preparation of a Negative Electrode Coating Material

An active material particle made of OMAC (product name; manufactured by Osaka Gas Co., Ltd.), PVDF as a binder, and carbon black (product name: DAB manufactured coating material was used, that the processing linear pressure was 150 kgf/cm, and that the punched-out piece had a length of 102 mm and a width of 144 mm.

Making of a Lithium-Ion Secondary Battery

Respective leads were electrically connected to the positive and negative electrodes, each of the fiber-containing polymer films made as mentioned above was arranged between and in contact with the negative and positive electrodes, so as to form a power generating element. Here, the positive and negative electrode active material layers were arranged so as to be in contact with the fiber-containing polymer film.

Next, the power generating element was inserted into a case of a battery and, while it was held in a vacuum state, an electrolytic solution was injected therein. Employed as the electrolytic solution was one in which $LiPF_6$ was dissolved at a concentration of 1.5 M in a mixed solvent of PC (propylene carbonate), EC (ethylene carbonate), and DEC (diethyl carbonate) (in a PC/EC/DEC volume ratio of 2:1:7). Subsequently, while the positive and negative electrode leads were partly inserted in the case, the opening of the case was sealed under vacuum. Thereafter, the resulting product was charged with a current equivalent to 0.05 C for about 5 min for preventing polarity inversion and then left for one night, whereby lithium-ion secondary batteries of Examples 1 to 30 and Comparative Example 1 having a capacity of 2 Ah were completed.

Measurement of Impedance

Each of the above-mentioned lithium-ion secondary batteries was subjected to 10 cycles of charging and discharging with a current equivalent to 0.5 C and then charged to 3.8 V. Thereafter, its impedance (unit: mΩ) at 1 KHz was determined by an impedance analyzer (manufactured by Solartron). The results were listed in Table 2. When the impedance value is 8.0 mΩ or less, the lithium-ion secondary battery can be said to have sufficiently low impedance. When the impedance value is 6.0 mΩ or less, the lithium-ion secondary battery can be said to have particularly favorable impedance.

Measurement of Shutdown Temperature and Evaluation of Heat Resistance

Each of the lithium-ion secondary batteries made as mentioned above was placed in a high-temperature bath. While measuring the voltage of the lithium-ion secondary battery, its temperature was raised to 170° C. at a heating rate of 5° C./min, and a temperature at which the battery voltage drastically dropped (short-circuiting temperature) was determined, whereby the heat resistance (strength) was evaluated. The results were listed in Table 2.

TABLE 2

|  | Impedance [mΩ] | Short-circuiting temp. [° C.] |
| --- | --- | --- |
| Example 1 | 4.5 | 162 |
| Example 2 | 4.6 | 164 |
| Example 3 | 4.6 | 168 |
| Example 4 | 4.8 | 164 |
| Example 5 | 4.8 | 170 |
| Example 6 | 7.6 | No short circuit |
| Example 7 | 7.2 | No short circuit |
| Example 8 | 5.0 | No short circuit |
| Example 9 | 5.0 | No short circuit |
| Example 10 | 7.6 | No short circuit |
| Example 11 | 7.2 | No short circuit |
| Example 12 | 5.4 | No short circuit |
| Example 13 | 5.6 | No short circuit |
| Example 14 | 6.0 | No short circuit |
| Example 15 | 6.5 | No short circuit |
| Example 16 | 3.9 | 155 |
| Example 17 | 4.1 | 156 |
| Example 18 | 7.8 | No short circuit |
| Example 19 | 8.0 | No short circuit |
| Example 20 | 7.6 | No short circuit |
| Example 21 | 7.2 | No short circuit |
| Example 22 | 5.0 | No short circuit |
| Example 23 | 3.6 | 154 |
| Example 24 | 3.8 | 162 |
| Example 25 | 3.9 | 165 |
| Example 26 | 4.0 | No short circuit |
| Example 27 | 4.1 | No short circuit |
| Example 28 | 5.2 | No short circuit |
| Example 29 | 6.6 | No short circuit |
| Example 30 | 7.2 | No short circuit |
| Comp. Ex. 1 | 10.9 | 145 |

As clear from the results listed in Table 2, it was seen that Comparative Example 1 had a high initial impedance in the battery, while the temperature at which the battery voltage drastically dropped was lower therein than in Examples. On the other hand, each of Examples 1 to 30 was seen to have sufficiently low impedance, thereby exhibiting favorable battery characteristics. Each of Examples 1 to 30 was also seen to have a short-circuiting temperature higher than that of Comparative Example 1, thereby yielding favorable heat resistance.

What is claimed is:

1. A fiber-containing polymer film for an electrochemical device comprising:
   a host polymer that contains at least one selected from the group consisting of polyvinylidene fluoride, fluorine rubbers, and polyethylene oxide; and
   a fibrous substance consisting of polyacrylonitrile, the fibrous substance having an average fiber diameter of 100 to 500 nm and an average fiber length of 10 to 100 μm;
   the fiber-containing polymer film having an orientation area where the fibrous substance is oriented in a direction substantially parallel to a main surface of the fiber-containing polymer film and in substantially the same direction.

2. The fiber-containing polymer film according to claim 1, wherein the orientation area exists over the whole area of the fiber-containing polymer film.

3. The fiber-containing polymer film according to claim 1, wherein the fiber-containing polymer film contains 10 to 50% by volume of the fibrous substance based on the total volume of the fiber-containing polymer film.

4. An electrochemical device comprising a polymer solid electrolyte film constructed by impregnating the fiber-containing polymer film according to claim 1 with an electrolyte salt.

5. The fiber-containing polymer film according to claim 1, which additionally comprises inorganic particles.

6. The fiber-containing polymer film according to claim 1, which additionally comprises an electrolyte salt.

7. The fiber-containing polymer film according to claim 6, wherein the electrolyte salt is a lithium salt.

8. A method of manufacturing a fiber-containing polymer film, the method comprising:
   preparing a coating material comprising a host polymer that contains at least one selected from the group consisting of polyvinylidene fluoride, fluorine rubbers, and polyethylene oxide, a fibrous substance consisting of a polymer compound, and a solvent;
   applying the coating material onto a support substrate by extrusion so as to form a coating film; and
   eliminating the solvent from the coating film so as to form a fiber-containing polymer film,
   the fiber-containing polymer film having an orientation area where the fibrous substance is oriented in a direction substantially parallel to a main surface of the fiber-containing polymer film and in substantially the same direction.

9. The method of manufacturing a fiber-containing polymer film according to claim 8, wherein applying the coating comprises expelling the coating material at an extrusion pressure of 1 to 30 kg/cm² from an outlet having a slit width of at least 10 times an average fiber diameter of the fibrous substance but not more than an average fiber length thereof so that the coating material is applied onto the support substrate and forms the coating film.

10. The method of manufacturing a fiber-containing polymer film according to claim 8, wherein the fibrous substance has an average fiber diameter of 100 to 500 nm and an average fiber length of 10 to 100 μm.

11. The method of manufacturing a fiber-containing polymer film according to claim 8, wherein the polymer compound has a melting point of 180° C. or higher.

12. The method of manufacturing a fiber-containing polymer film according to claim 8, wherein the polymer compound is selected from the group consisting of polyacrylonitrile, polyamide-imide, polyvinyl alcohol, and polyimide.

13. A method of manufacturing an electrochemical device, the method comprising the steps of:
forming a fiber-containing polymer film by the method of manufacturing a fiber-containing polymer according to claim 8; and
impregnating the fiber-containing polymer film with an electrolyte salt.

14. A method of manufacturing a fiber-containing polymer film, the method comprising:
preparing a first coating material containing a host polymer that contains at least one selected from the group consisting of polyvinylidene fluoride, fluorine rubbers, and polyethylene oxide, and a solvent;
preparing a second coating material containing a fibrous substance consisting of a polymer compound and a dispersant;
applying the first coating material onto a support substrate so as to form a first coating film;
applying the second coating material onto the first coating film by extrusion so as to form a second coating film; and
eliminating the solvent and dispersant from the first and second coating films so as to form a fiber-containing polymer film containing the host polymer and fibrous substance,
the fiber-containing polymer film having an orientation area where the fibrous substance is oriented in a direction substantially parallel to a main surface of the fiber-containing polymer film and in substantially the same direction.

15. The method of manufacturing a fiber-containing polymer film according to claim 14, wherein applying the second coating comprises expelling the coating material at an extrusion pressure of 1 to 30 kg/cm$^2$ from an outlet having a slit width of at least 10 times an average fiber diameter of the fibrous substance but not more than an average fiber length thereof so that the second coating material is applied onto the first coating film and forms the second coating film.

16. The method of manufacturing a fiber-containing polymer film according to claim 14, wherein the fibrous substance has an average fiber diameter of 100 to 500 nm and an average fiber length of 10 to 100 μm.

17. The method of manufacturing a fiber-containing polymer film according to claim 14, wherein the polymer compound has a melting point of 180° C. or higher.

18. The method of manufacturing a fiber-containing polymer film according to claim 14, wherein the polymer compound is selected from the group consisting of polyacrylonitrile, polyamide-imide, polyvinyl alcohol, and polyimide.

19. A method of manufacturing an electrochemical device, the method comprising the steps of:
forming a fiber-containing polymer film by the method of manufacturing a fiber-containing polymer according to claim 14; and
impregnating the fiber-containing polymer film with an electrolyte salt.

* * * * *